(12) United States Patent
Ruffa

(10) Patent No.: US 6,766,837 B1
(45) Date of Patent: Jul. 27, 2004

(54) ACOUSTIC FUEL SHUTOFF

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/655,633

(22) Filed: Sep. 4, 2003

(51) Int. Cl.$^7$ ............................................... B65B 1/04
(52) U.S. Cl. ........................................ 141/198; 141/95
(58) Field of Search .......................... 141/94, 95, 198, 141/392, 301, 192

(56) References Cited

U.S. PATENT DOCUMENTS

| | | | |
|---|---|---|---|
| 4,441,533 A | | 4/1984 | Snyder et al. |
| 4,787,407 A | * | 11/1988 | Vogel ............................ 137/2 |
| 5,085,077 A | * | 2/1992 | Stapleton et al. .......... 73/290 V |
| 5,251,482 A | | 10/1993 | Bates et al. |
| 5,507,326 A | * | 4/1996 | Cadman et al. ............. 141/198 |
| 5,785,100 A | | 7/1998 | Showalter et al. |
| 5,829,491 A | | 11/1998 | Bennett |
| 5,886,249 A | | 3/1999 | Bonne et al. |
| 5,975,154 A | | 11/1999 | Bennett |
| 5,975,165 A | | 11/1999 | Motosugi et al. |
| 6,047,602 A | | 4/2000 | Lynnworth |
| 6,341,629 B1 | | 1/2002 | Clark et al. |

FOREIGN PATENT DOCUMENTS

JP           404232818 A    8/1992

\* cited by examiner

Primary Examiner—Steven O. Douglas
(74) Attorney, Agent, or Firm—James M. Kasischke; Michael P. Stanley; Michael F. Oglo

(57) ABSTRACT

A system for preventing overflow from a tank being filled. An open-ended elongated adapted for fixture to a tank extends from an opening of the tank and proximate to a bottom of the tank. A nozzle connectable to a source of pressurized liquid has an open end extension extending through the opening into the elongated tube. The nozzle creates broadband acoustic signals inside of the elongated tube during filling. A microphone mounted on the nozzle near the open end extension senses resonant frequency signals of the acoustic signals and generates representative signals. A module processes the representative signals and generates a closing signal when the representative signals represent a critical resonant frequency. A shut-off valve between the fuel source and the nozzle is responsive to the closing signal.

15 Claims, 1 Drawing Sheet

ACOUSTIC FUEL SHUTOFF

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a nozzle that prevents overflow spills. More particularly, the invention relates to a fuel nozzle system using acoustic signals generated by flowing fuel to shut off the flow of fuel when the resonance of predetermined acoustic signals is acoustically sensed.

(2) Description of the Prior Art

Many current systems that indicate levels in a tank that is being filled are mechanical in nature, i.e., switches are activated by fluid backpressure. Such systems usually work, but not always when the tank is being "topped-off", and often, spillover of liquid or liquid fuel will occur. Some systems using electrical sensors have the problems associated with calibration, and the complexities of interconnected multiple components raise questions of reliability.

Thus, in accordance with the inventive concept herein, a need has been recognized in the art for a nozzle system for petroleum fuel or other liquids in which the nozzle system uses acoustic signals generated by flowing fuel or the liquid to shut off the flow when the resonance of predetermined acoustic signals is acoustically sensed.

SUMMARY OF THE INVENTION

Accordingly, it is a general purpose and primary object of the present invention to provide an acoustic switch that prevents spillover during filling.

It is a further object of the present invention to provide a system for automatically shutting off the flow of liquid into a tank.

It is a still further object of the present invention to provide a fuel nozzle system using acoustic signals generated by flowing liquid fuel to shut off the fuel flow when resonance of predetermined acoustic signals is acoustically sensed.

It is a still further object of the present invention to provide a fuel nozzle system for shutting off the flow of fuel to a tank at selectively different levels.

It is a still further object of the present invention to provide a nozzle system for optically or audibly indicating a predetermined level of fuel in a tank.

It is a still further object of the present invention to provide a system acoustically sensing the level of fuel in a tank for initiating visual and/or optical indicators and shutting off the flow of fuel thereto.

These and other objects of the invention will become more readily apparent from the ensuing specification when taken in conjunction with the appended claims.

To attain the objects described, there is provided a nozzle system for preventing overflow from a tank being filled. In the system, an open-ended elongated tube is disposed in a fuel tank to extend between an opening of the tank at one end and proximate to a bottom of the tank at the other end. A refueling nozzle connected to a source of pressurized fuel or other pressurized liquid has an open end extension to extend through the tank opening and into the elongated tube. The nozzle creates broadband acoustic signals inside of the elongated tube by the turbulent flow of fuel through the nozzle during the filling.

A microphone is mounted on the nozzle near the extension to sense resonant frequency signals of the acoustic signals to generate representative signals. A processing module is connected to the microphone to receive and process the representative signals such that a close signal is generated when the representative signals represent a critical resonant frequency.

The critical resonant frequency is representative of the length of the elongated tube between the opening and the level of fuel in the elongated tube inside of the tank. The critical resonant frequency is predetermined to occur at a level of fuel in the elongate tube corresponding to a full, no-spill level in the tank. A shut-off valve is connected between the fuel source and the nozzle and is responsive to the processing module. The close signal from the processing module closes the flow of pressurized fuel from the source.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein like reference numerals refer to like parts and wherein.

DESCRIPTION OF THE PREFERRED EMBODIMENTS

Figure 1:
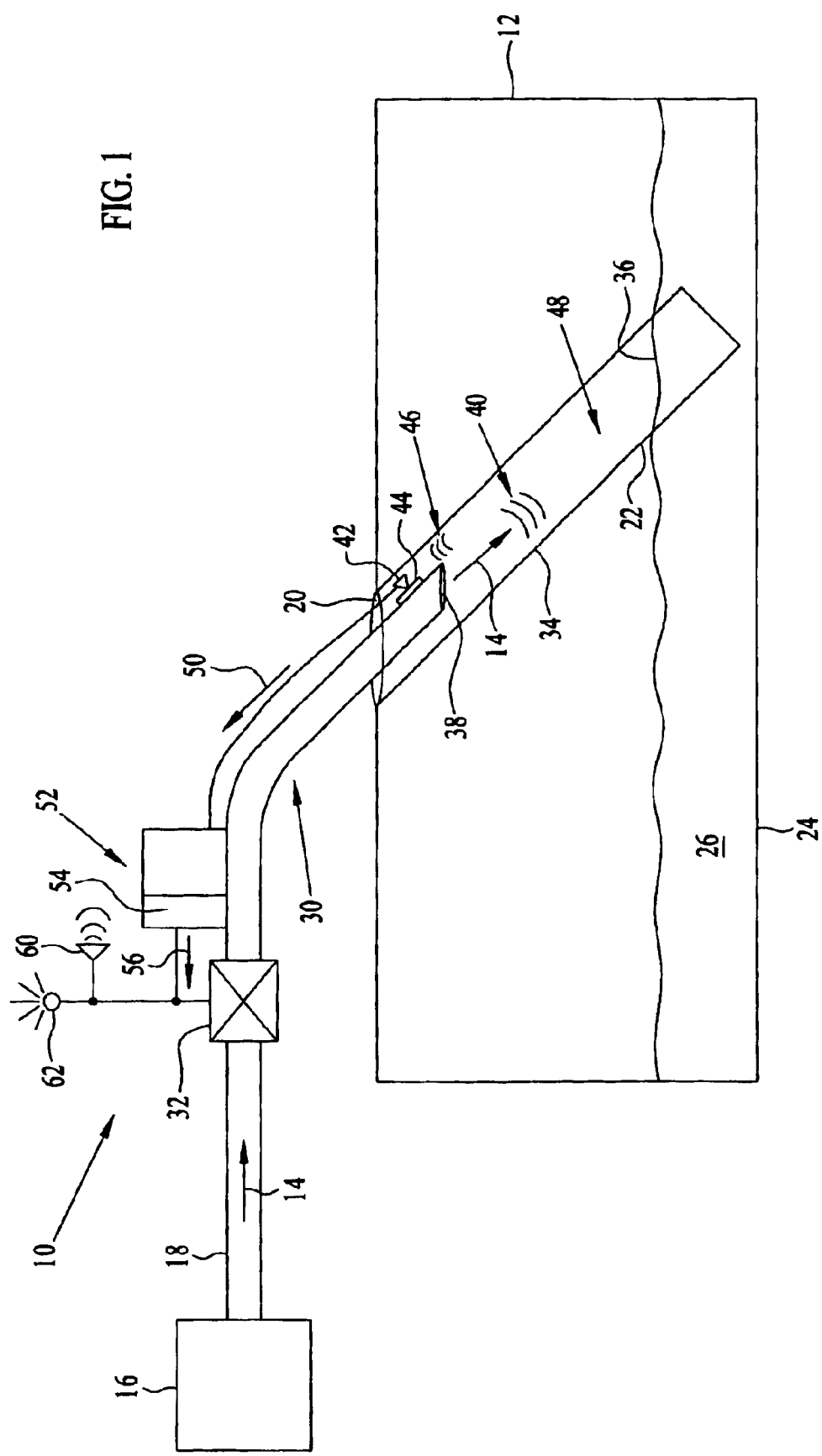
FIG. 1 is a schematic of the nozzle system of the present invention, in a cross section, for acoustically sensing a level in a tank being filled.

Referring now to the drawing(s), FIG. 1 depicts the fuel nozzle system 10 of the present invention being employed with a fuel tank 12 to be filled. Under a typical filling operation, pressurized liquid or fuel flowing (shown as arrows 14) flows from a remote storage source 16, through a supply hose 18, and into the fuel tank 12.

For purposes of depicting the typical filling operation, a fuel system is shown; however, any filling operation is suitable to the present invention with minor alterations known to those skilled in the art. The fuel tank 12 could be in an automobile, boat, aircraft, building or any other place that has a container of fuel for motors, heating, etc. The fuel tank 12 typically has a filler opening 20 that is closed by a protective cap (not shown), and an elongated conduit or tube 22, that is open-ended at opposite ends. The elongated tube 22 extends from opening 20 toward the bottom 24 of the tank 12. The filler opening 20 is large enough to receive a filling nozzle 30 of the present invention connected to the supply hose 18.

In further description of the present invention, the fuel nozzle system 10 has a shut-off valve 32 connectable to the end of the supply hose 18. The valve 32 automatically shuts off the flow of fuel 14 from the supply hose 18 to prevent spillage or overflow that might otherwise occur if too much fuel were supplied to tank 12 beyond its capacity.

Like many conventional nozzles, the nozzle 30 can be actuated by an operator to feed the pressurized fuel 14 into the tank 12. As the amount of fuel 14 through the nozzle 30 starts to accumulate as stored fuel 26 in the tank 12, an open-ended elongated filling tube 34 is partially filled to a level 36 that is the same as the level of stored fuel in the rest of the tank 12.

During filling of the tank 12, pressurized fuel 14 is forced through an open end extension 38 of the nozzle 30. The fuel 14 flows into elongated tube 34 and splashes into the stored fuel 26. The turbulent flow of fuel 14 acts as a broadband acoustic sound source creating broadband acoustic signals 40 inside of the elongated tube 34.

The nozzle 30 includes an acoustic sensor, or microphone 42 mounted near the open end extension 38 that is inserted through the filler opening 20 and partially into the elongated tube 34 during filling. The microphone 42 can be mounted on an interposed sound attenuating layer 44 on the open end extension 38 to reduce excessive levels of the broadband acoustic signals 40 from being directly sensed from the nozzle 30. The microphone 42 senses resonant frequency signals 46 of the broadband acoustic signals 40 created from the turbulent flow of the fuel 14 that are representative of a resonant chamber 48 having a length that extends in the elongated tube 34 between the filler opening 20 and the fuel level 36.

More specifically, the resonant chamber 48 has resonant properties based on its length, (i.e., the height or the level 36 of the fuel in the elongated tube 34). As the elongated tube 34 and the tank 12 begin to fill with fuel, the resonant frequency (pitch) increases since the length between the filler opening 20 and the level 36 becomes progressively shorter. Because the fuel 14 rushing into the elongated tube 34 creates a sufficiently broadband sound source, the increase in pitch can be easily discerned even by the unaided ear. As such, the microphone 35 easily discerns resonant frequency signals 46 having changing pitches (or frequencies) that correspond to changing heights of the level 36 and emits signals (shown as arrow 50) representative of the level to an interconnected processing module 52.

The processing module 52 can include a commercially available computer 54 and associated support components that have been appropriately interconnected and programmed to perform running Fast Fourier Transform (FFT) analyses on successive representative signals 50 from the microphone 42. The FFT analyses can be made on successive time windows of about 0.1 second to allow for fast updates. This rate of analysis leads to frequency bins of about 10 Hz which have been found to be sufficiently accurate for the frequency resolution demands of the present invention.

Many different processors that perform signal analyses including FFT analyses and produce an indication or actuation signal when certain signals are detected in an incoming signal are well-known in the art. One skilled in the art to which the present invention pertains can select known components for the processing module 52 to produce the processing of representative signals 50 as called for herein within the scope of ordinary skill.

Continuing with the operation of the nozzle system 10, the processing module 52 then identifies the frequency bin in the acoustic range of the representative signals 52 having the highest value (resonant frequency or pitch). A check on the validity of a particular resonant frequency or pitch of a specifically identified frequency bin can be made by the processing module 52 by referring back to the history or recent iterations of analyses of resonant frequencies that should be steadily increasing in accordance with successive updates from representative signals 50 from the microphone 42. From the identified frequency bin, the resonant frequency of the representative signals 50 can be determined; and consequently, from previously gathered or empirically generated data in the processing module 52, the height of the air column above the level 36 in the elongated tube 22 can be determined.

The processing module 52 can discern when the acoustic pitch of the resonant frequency of the representative signals 50 reaches a threshold value at a critical resonant frequency. At the critical resonant frequency, the level 36 can be at the full, no-spill level. The processing module 52 generates a closing signal (shown as arrow 56) that is coupled to the shut-off valve 32.

Upon receipt of the closing signal 56, the shut-off valve 32 shuts off the flow of fuel 14. Optionally, the closing signal 56 can be coupled to an audio alarm 60 (audio speaker) and/or a visual alarm 62 (flashing light) that can give attendants an audio and/or visual indication that the tank 24 is full and an automatic shut-off of the flow of fuel 14 has been made. As a further option, the critical resonant frequency can reset for a lower fuel level in the tank 12 when lesser amounts of fuel are to be transferred.

In a summary of the filling operation, the nozzle 30 is inserted into the tank 12 through the filler opening 20. Upon actuation, the nozzle 30 releases the pressurized fuel 14 to flow into the tank 12. The predominant pitches or resonant frequencies 46 in the elongated tube 34 are continuously monitored by the processing module 52 receiving the representative signals 50 from the microphone 42. A running FFT is performed on the representative signals 50. When the predominant pitch arrives at or exceeds a preset value at the predetermined shut-off level, the valve 32 is actuated by the processing module 52 to discontinue filling. The preset value for the "shut-off" pitch is predetermined by measuring the fuel height vs. pitch for a number of different tanks.

Factors affecting the pitch are the height of the air column above the level 36 inside of the elongated tube 34, as well as the acoustic boundary condition. The acoustic boundary condition represents the complex geometry involving the refueling nozzle 30 which will be somewhat different for every tank. Based on this non-exhaustive list of factors, a single value for pitch is decided.

It is understood that other frequency-discriminating signal analyses could be used in accordance with this invention to allow improved signal analyses for many different types of tanks to assure reliable determinations of a fuel or liquid level. One skilled in the art to which this invention applies could make such selections without departing from the scope of this invention herein described. Having this disclosure in mind, selection of suitable components from among many proven contemporary designs and compactly interfacing them in the fuel nozzle system 10 can be readily done without requiring anything beyond ordinary skill.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for preventing overflow from a tank being filled, said system comprising:

an open-ended elongated tube adapted for fixture to a fuel tank, said elongated tube extending from an opening of the tank at one end and proximate to a bottom of the tank at the other end;

a nozzle connectable to a source of pressurized liquid, said nozzle having an open end extension extending through said opening and into said elongated tube;

an acoustic sensor mounted on said open end extension, said acoustic sensor capable of sensing resonant frequency signals of acoustic signals emitted as a result of a splashing action of the pressurized liquid during filling of the tank and subsequently capable of generating signals representative thereof;

a module responsive to the representative signals to generate a closing signal when the representative signals represent a critical resonant frequency; and a valve connectable between the source of pressurized liquid and connected to said nozzle, said valve actuated to close by the closing signal.

2. The system in accordance with claim 1 wherein the acoustic signals are created by a turbulent flow of the pressurized liquid through said nozzle.

3. The system in accordance with claim 2 wherein the critical resonant frequency is representative of the length of said elongated tube between said opening and a level of liquid in said elongated tube.

4. The system in accordance with claim 3 wherein the critical resonant frequency is predetermined to occur at a predetermined level of liquid in said elongated tube.

5. The system in accordance with claim 4 wherein the critical resonant frequency is predetermined to occur at the predetermined level of liquid in said elongated tube corresponding to a full, no-spill level in the tank.

6. The system in accordance with claim 1 further comprising:

a sound attenuating layer interposed between said acoustic sensor and said open end extension, wherein said sound attenuating layer is capable of reducing excessive levels of the acoustic signals from being sensed from said acoustic sensor.

7. The system in accordance with claim 6 further comprising;

an audio alarm responsive to the closing signal to give an audio indication of the tank being full and of an actuation of said valve.

8. The system in accordance with claim 6 further comprising:

a visual alarm responsive to the closing signal to give a visual indication of the tank being full and of an actuation of said valve.

9. The system in accordance with claim 7 further comprising:

a visual alarm responsive to the closing signal to give a visual indication of the tank being full and of an actuation of said valve.

10. A system for preventing overflow from a tank being filled from a pressurized fuel source, said system comprising:

means for filling the tank;

a conduit for said filling means, said conduit adapted for fixture to the tank;

a sensor for sensing resonant signals emitted as a result of a splashing action of pressurized fuel during the filling of the tank from the fuel source;

a means for generating a closing signal, said generating means responsive to said sensor; and a valve for closing the filling from the pressurized fuel source based on the closing signal.

11. The system in accordance with claim 10 wherein a critical resonant frequency is representative of the resonant signals and a predetermined level in the tank; and wherein said generating means generates the closing signal based on the critical resonant frequency.

12. The system in accordance with claim 11, wherein said system further comprises:

a means for attenuating excessive levels of the resonant signals from being sensed by said sensor.

13. A method of preventing overflow from a tank being filled by a pressurized source of liquid, said method comprising the steps of;

generating acoustic signals representative of a splashing action of pressurized liquid from the pressurized source of liquid to the tank during the filling operation of the tank;

sensing resonant frequency signals based on said generated acoustic signals;

generating representative signals based on said sensed resonant frequency signals;

generating a closing signal based on said generated representative signals when said generated representative signals represent a critical resonant frequency; and closing a valve between the source of pressurized liquid and the tank to prevent overflow, the valve actuated to close by said generated closing signal.

14. The method in accordance with claim 13, said method comprising the step of:

predetermining a level in the tank, wherein the critical resonant frequency is based upon said predetermined level.

15. The method in accordance with claim 14, said method comprising the further step of:

attenuating excessive levels of said generated acoustic signals from being sensed as said resonant frequency signals.

* * * * *